Patented Feb. 10, 1925.

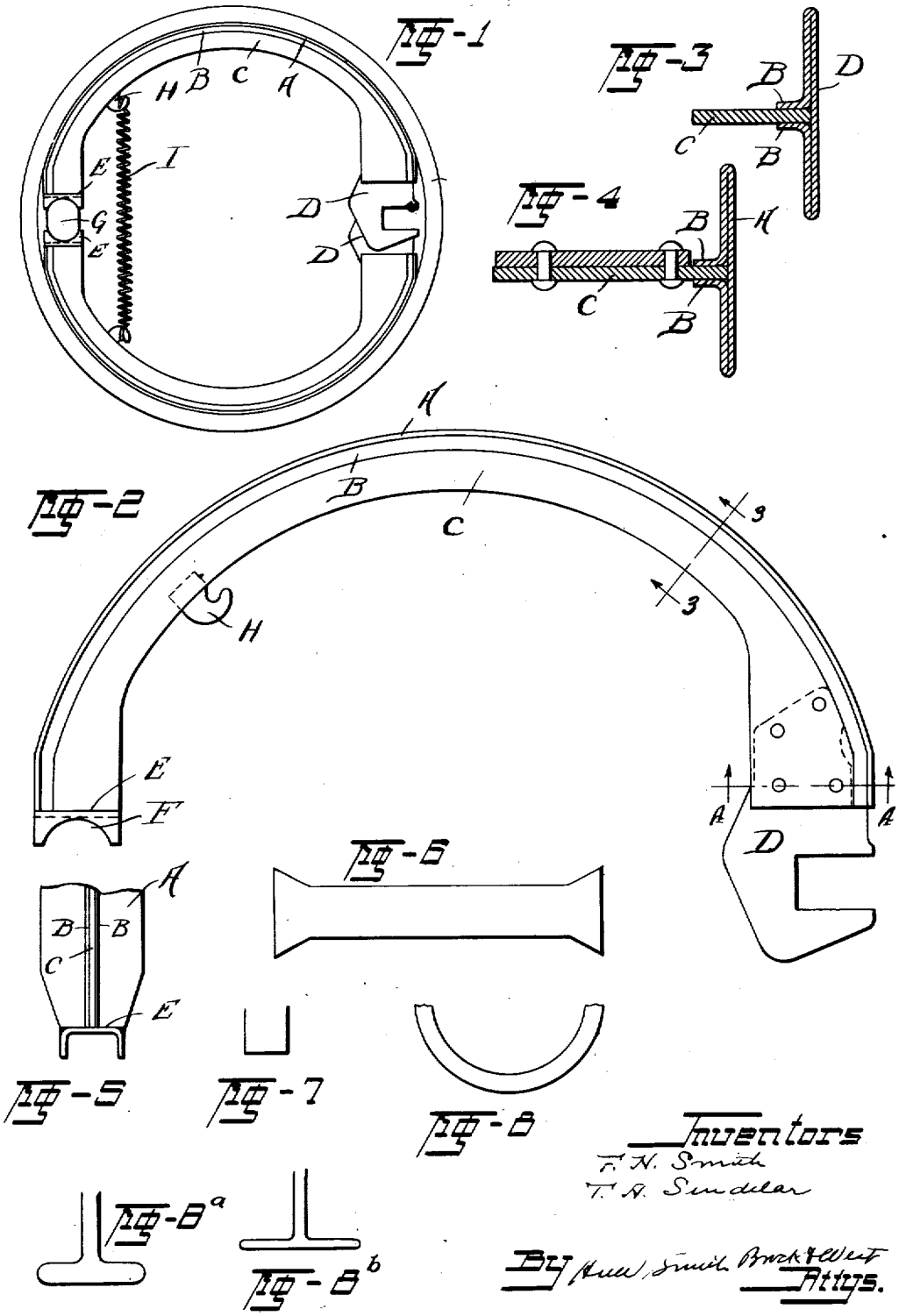
Feb. 10, 1925.
F. H. SMITH ET AL
AUTOMOBILE BRAKE BAND
Filed June 12, 1919
1,526,098
2 Sheets-Sheet 1

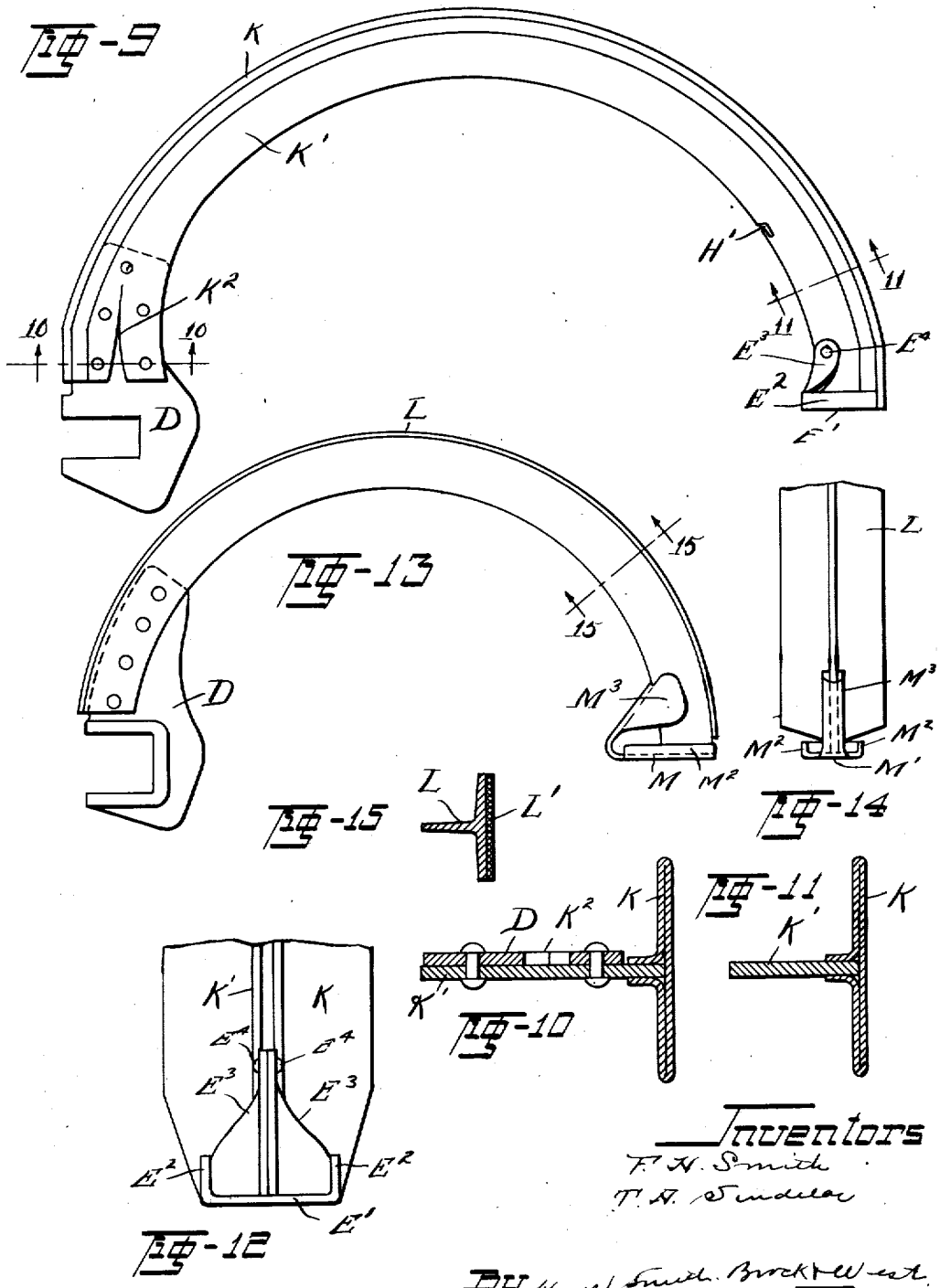

1,526,098

UNITED STATES PATENT OFFICE.

FRANK H. SMITH AND THOMAS A. SINDELAR, OF CLEVELAND, OHIO.

AUTOMOBILE BRAKE BAND.

Application filed June 12, 1919. Serial No. 303,686.

REISSUED

*To all whom it may concern:*

Be it known that we, FRANK H. SMITH and THOMAS A. SINDELAR, citizens of the United States, residing at Cleveland, in the county of Cuyahoga and State of Ohio, have invented a certain new and useful Improvement in Automobile Brake Bands, of which the following is a full, clear, and exact description, reference being had to the accompanying drawings.

This invention relates generally to brakes for automobile wheels and more particularly to the construction in the internal brake band. The object is to provide a simple and inexpensive construction of internal brake band and with this object in view the invention consists in the novel features of construction hereinafter fully described and set forth in the appended claims.

In the drawings forming a part of this specification. Fig. 1 is a diagrammatic view showing the mode of application of our invention; Fig. 2 is a detail view of one section of the brake band removed from the drum; Fig. 3 a detail sectional view on the line 3—3 of Fig. 2; Fig. 4 a sectional view on the line 4—4 of Fig. 2; Fig. 5 is a face view of one end and Fig. 6 is a plan view of a blank for forming the entire section from a single piece of metal; and Figs. 7, 8, 8ª and 8ᵇ are detail views illustrating the various steps of making the one-piece section; Fig. 9 shows a modified form of construction; Fig. 10 is a section on the line 10—10 of Fig. 9; and Fig. 11 is a section on the line 11—11 of Fig. 9; Fig. 12 is a face view of one end; Fig. 13 shows a further modification; Fig. 14 is a face view of one end of the same; and Fig. 15 is a section on the line 15—15 of Fig. 13.

In carrying out our invention we employ a strip of sheet metal which is rolled to provide a double semi-circular band A having inwardly projecting parallel flanges B and inserted between said parallel flanges and secured thereto by welding, brazing or otherwise is a semi-circular plate C which being in a plane perpendicular to the surface of the band serves as a strengthening means for the rolled sheet metal band. The sheet metal being rolled back upon itself as shown and thereby providing a band of double thickness will have considerable rigidity and this coupled with the semi-circular strip or plate C will provide a brake band sector of sufficient strength to withstand all the strains placed thereon. To one end of the sector thus formed is attached the usual or any preferred type of fitting D and at the opposite end of the sector there is arranged a shoe E, this being preferably channel shaped and pressed from sheet metal and welded to the end of the sector composed of the band and plate and the end of this shoe is cut away in the form of a semi-circle as shown at F in order to engage the cam G for actuating the brake band sectors. A sheet metal hook H is welded to the plate portion of the sector as shown and adapted to receive the spring I which normally holds the brake band out of engagement. The fitting is connected to the end of the sector by rivets or in any other suitable manner. A brake band constructed as herein shown and described is exceedingly strong, durable, easily fabricated and in operation preferable to a cast or forged band.

In Figs. 6, 7, 8 and 8ª and 8ᵇ we have shown a slightly modified form of band in which the cylindrical band portion and the inwardly projecting reinforcing rib are all formed from a single piece of sheet metal, the plate being first bent into channel form, then curved to produce the semi-circle and then transformed by the proper pressing operations into a T-shaped band comprising in a single piece the semi-circular cylindrical or band portion and the inwardly projecting rib or reenforcing portion. The fitting and the shoe and likewise the hook will be connected as previously described.

In the construction shown in Fig. 9, the band K is made of pressed metal as previously described, and has the plate K' connected thereto as previously set forth. The end of the plate however to which the fitting D is attached is split and spread as shown at K² in order to provide a broad point of attachment for the fitting. The shoe E' is constructed with the side flanges E² and ears E³ which are connected to the plate by rivets E⁴. The hook H' is provided by cutting an L-shaped notch in the plate member.

In the construction illustrated in Fig. 13, the band L is T-shaped in cross section, this being formed from a rolled section and given the proper semi-circular shape and provided with a suitable facing L'. The fitting D is riveted to one end as heretofore described, and a shoe M connected to the opposite end is pressed from sheet metal and comprises flat portion M' having the flanges M² and the integral brace ears M³ welded or otherwise secured to the band and it will of course be understood that the flat portion of the shoe is also welded to the end of the bearing. Brake bands constructed as herein shown and described can be made much cheaper than the bands heretofore made by casting or forging, and have been found superior in operation.

Having thus described our invention, what we claim is:—

1. A sheet metal brake shoe comprising a curved portion having inwardly extending parallel flanges, a curved strip or plate arranged between said flanges and rigidly connected thereto and a sheet metal member rigidly connected to one end of said band.

2. A sheet metal brake band having a semi-circular plate rigidly connected thereto and providing a T-shaped brake member, one end of said plate being expanded, a fitting secured to said expanded end, a shoe rigidly connected to the opposite end of the brake member, said shoe comprising a flanged flat portion and integral braced ears, said ears and flat portions being welded to the end of the brake member.

In testimony whereof, we hereunto affix our signatures.

FRANK H. SMITH.
THOMAS A. SINDELAR.